US012759790B2

(12) United States Patent
Abe et al.

(10) Patent No.: US 12,759,790 B2
(45) Date of Patent: Oct. 13, 2026

(54) CEILING CARRIER

(71) Applicant: DAIFUKU CO., LTD., Osaka (JP)

(72) Inventors: Takeshi Abe, Shiga (JP); Takumi Sakata, Shiga (JP); Daichi Tomida, Shiga (JP); Yoshitaka Tanaka, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 272 days.

(21) Appl. No.: 18/653,009

(22) Filed: May 2, 2024

(65) Prior Publication Data

US 2024/0375867 A1 Nov. 14, 2024

(30) Foreign Application Priority Data

May 11, 2023 (JP) ................................ 2023-078863

(51) Int. Cl.
*B65G 1/04* (2006.01)

(52) U.S. Cl.
CPC .................................. *B65G 1/0464* (2013.01)

(58) Field of Classification Search
CPC ............................ B65G 1/0457; B65G 1/0464
See application file for complete search history.

(56) References Cited

U.S. PATENT DOCUMENTS 9,168,930 B2 * 10/2015 Wada ........................ B61B 3/02
9,263,311 B2 * 2/2016 Ota ..................... H10P 72/3221
11,069,549 B2 * 7/2021 Wada .................. H10P 72/3211
11,084,505 B2 * 8/2021 Kobayashi ................ B61B 3/02
11,276,597 B2 * 3/2022 Kobayashi .............. B61B 12/00
11,286,136 B2 * 3/2022 Gunji ....................... B66C 17/04
11,787,630 B2 * 10/2023 Takahara ............. B65G 1/0457 414/281
11,905,113 B2 * 2/2024 Shiroishi .................... B61B 3/02
11,961,751 B2 * 4/2024 Kobayashi .......... H10P 72/3214
12,119,249 B2 * 10/2024 Wada .................. H10P 72/3214
2015/0329334 A1 11/2015 Lee et al.
2017/0243775 A1 * 8/2017 Kobayashi ................ B61B 3/00
2022/0258982 A1 8/2022 Tomida
2022/0402694 A1 12/2022 Kobayashi

FOREIGN PATENT DOCUMENTS

JP 2009-040563 A 2/2009
JP 2021-075388 A 5/2021
JP 2022125650 A 8/2022
KR 2022-0091112 A 6/2022
WO 2021049203 A1 3/2021

* cited by examiner

*Primary Examiner* — Jonathan Snelting
(74) *Attorney, Agent, or Firm* — Harness, Dickey & Pierce, P.L.C.

(57) ABSTRACT

In order to prevent an article from oscillating or inclining, a ceiling carrier includes: an elevator member including a body part, a gripping part that grips an article P, elastic parts that elastically support the gripping part, and a locking mechanism that creates a lock state which prevents the elastic parts from operating; and a switching part that switches between the lock state and an unlock state of the locking mechanism, the switching part being configured to switch the locking mechanism from the lock state to the unlock state after the article P has been sandwiched between oscillation prevention parts.

6 Claims, 8 Drawing Sheets

CEILING CARRIER

This Nonprovisional application claims priority under 35 U.S.C. § 119 on Patent Application No. 2023-078863 filed in Japan on May 11, 2023, the entire contents of which are hereby incorporated by reference.

TECHNICAL FIELD

The present invention relates to a ceiling carrier configured to convey an article.

BACKGROUND ART

Ceiling carriers have been known which suspend and hold the articles with use of elevator parts to convey the articles. When such a ceiling carrier conveys and transfers an article, the article oscillates in some cases. In order to reduce an effect caused by the oscillation, diverse improvements have been made. For example, Patent Literature 1 discloses a ceiling carrier that includes a locking mechanism which locks a relative positional relation between a suspension attaching portion and a base to which a gripping part is provided; that locks the locking mechanism while being raised and lowered; and that unlocks the locking mechanism while travelling.

In addition, Patent Literature 2 discloses an article carrier in which an abutting part included in an oscillation prevention mechanism for preventing oscillation by abutting on a side surface of an article is elastically supported in a vertical direction, so that transmission of the shake in a vertical direction is reduced while the lateral oscillation is prevented.

CITATION LIST

Patent Literature

[Patent Literature 1]
International Publication No. WO2021/049203
[Patent Literature 2]
Japanese Patent Application Publication Tokukai No. 2022-125650

SUMMARY OF INVENTION

Technical Problem

In the conventional art, the ceiling carrier starts travelling on accommodation of an article, and then the oscillation prevention mechanism configured to be in contact with the side surface of the article to prevent the article from oscillating is operated, and at the same time, a fall prevention mechanism configured to protrude toward the bottom surface of the article to prevent the article from falling is operated.

Therefore, there are unfortunately problems that the article oscillates and is inclined immediately after the start of the travelling and that the article inclined is caught on the fall prevention mechanism and the ceiling carrier travels with the article inclined.

An aspect of the present invention is achieved in light of the foregoing problem, and it is an object of the aspect of the present invention to achieve a ceiling carrier that prevents an article from oscillating or inclining.

Solution to Problem

In order to attain the object, a ceiling carrier in accordance with an aspect of the present invention is a ceiling carrier configured to convey an article, the ceiling carrier including: a travelling part that travels along a track; an elevator member that is suspended from the travelling part so as to be raisable and lowerable and that grips an article; and oscillation prevention parts between which the article is sandwiched so as to prevent the article from oscillating. The elevator member includes: a body part; a gripping part that grips the article; elastic parts that elastically support the gripping part with respect to the body part; and a locking mechanism that creates a lock state which prevents the gripping part from operating with respect to the body part due to the elastic parts. The ceiling carrier further includes a switching part that switches between the lock state and an unlock state of the locking mechanism, the switching part switching from the lock state of the locking mechanism to the unlock state after the article has been suspended and has been sandwiched between the oscillation prevention parts.

Advantageous Effects of Invention

According to an aspect of the present invention, because a locking mechanism enters an unlock state after an article has been sandwiched between the oscillation prevention parts, it is possible to prevent a situation in which the locking mechanism enters an unlock state before the article has been sandwiched between the oscillation prevention parts, resulting in oscillation and/or inclination of the article.

DESCRIPTION OF EMBODIMENTS

The following description will discuss an embodiment of the present invention in detail. A ceiling carrier 1 in accordance with the present embodiment travels along a track provided at a position higher than the floor surface, for example, on the ceiling, so as to convey an article P, such as a front opening unified pod (FOUP). The FOUP accommodates, for example, a plurality of semiconductor wafers.

Figure 1:
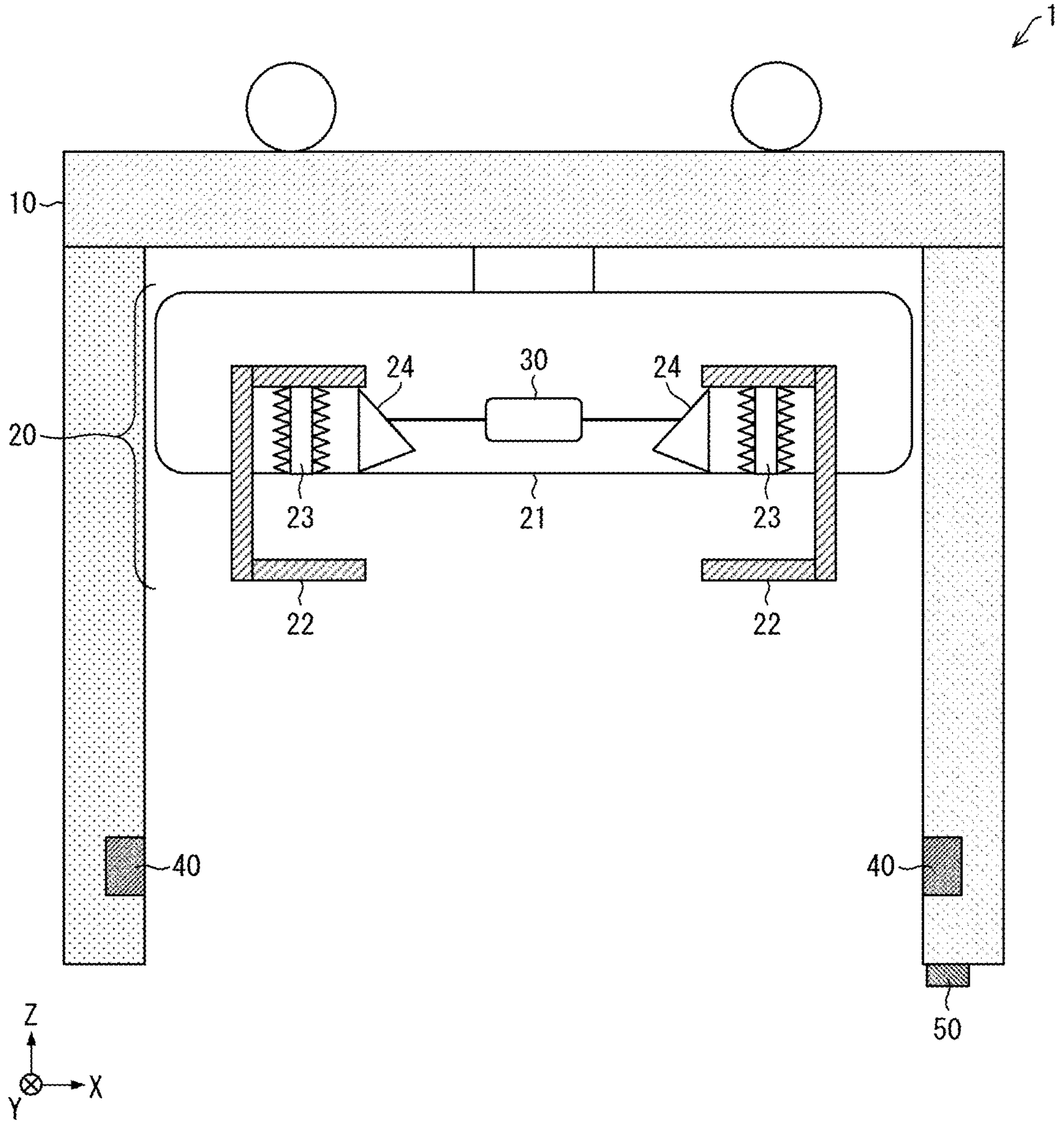
FIG. 1 is a front view illustrating a ceiling carrier in accordance with an embodiment of the present invention.

FIG. 1 is a front view illustrating the ceiling carrier 1. As illustrated in FIG. 1, the ceiling carrier 1 includes a travelling part 10 that travels along a track (not illustrated), an elevator member 20 that is suspended from the travelling part 10 so as to be raisable and lowerable and that grips the article P, and a switching part 30 that switches between states of a locking mechanism 24. Further, the ceiling carrier 1 includes oscillation prevention parts 40 that reduce the oscillation of the article P when the article P is conveyed and a fall prevention part 50 that prevents the article P from falling.

In the present embodiment, it is assumed that an X direction is a direction in which the ceiling carrier 1 travels; a Y direction is a direction perpendicular to the travelling direction on a horizontal plane; and a Z direction is a direction in which the elevator member 20 is raised and lowered. In the ceiling carrier 1 illustrated in FIG. 1, the X direction is a direction from left to right with respect to the drawing; the Y direction is a direction from front to back with respect to the drawing; and the Z direction is a direction from down to up with respect to the drawing.

The elevator member 20 includes a body part 21, a gripping part 22 that grips the article P, elastic parts 23 that elastically support the gripping part 22 with respect to the body part 21, and a locking mechanism 24 that creates a lock state which prevents the gripping part 22 from operating with respect to the body part 21 due to the elastic parts 23.

The gripping part 22 is a part for gripping the article P. The gripping part 22 grips the article P using a pair of members of the gripping part 22 so that part of the article P is sandwiched therebetween.

The elastic parts 23 are each provided to the corresponding one of the pair of members of the gripping part 22. The elastic parts 23 may elastically support the gripping part 22 in a vertical direction with respect to the body part 21. Elastically supporting the gripping part 22 makes it possible to reduce oscillation of the gripping part 22 in a vertical direction (Z direction). That is, it is possible to reduce the oscillation in a vertical direction of the article P gripped by the gripping part 22.

The elastic parts 23 are located so as to be aligned in a horizontal direction as well as are each provided to the corresponding one of the pair of members of the gripping part 22. That is, the elastic parts 23 that provide elastic support in a vertical direction are located so as to be aligned in a horizontal direction. This makes it possible to prevent the article P from being gripped by the gripping part 22 in an inclined state. Here, the "horizontal direction" refers to a direction parallel to a horizontal plane (X-Y plane).

Figure 2:
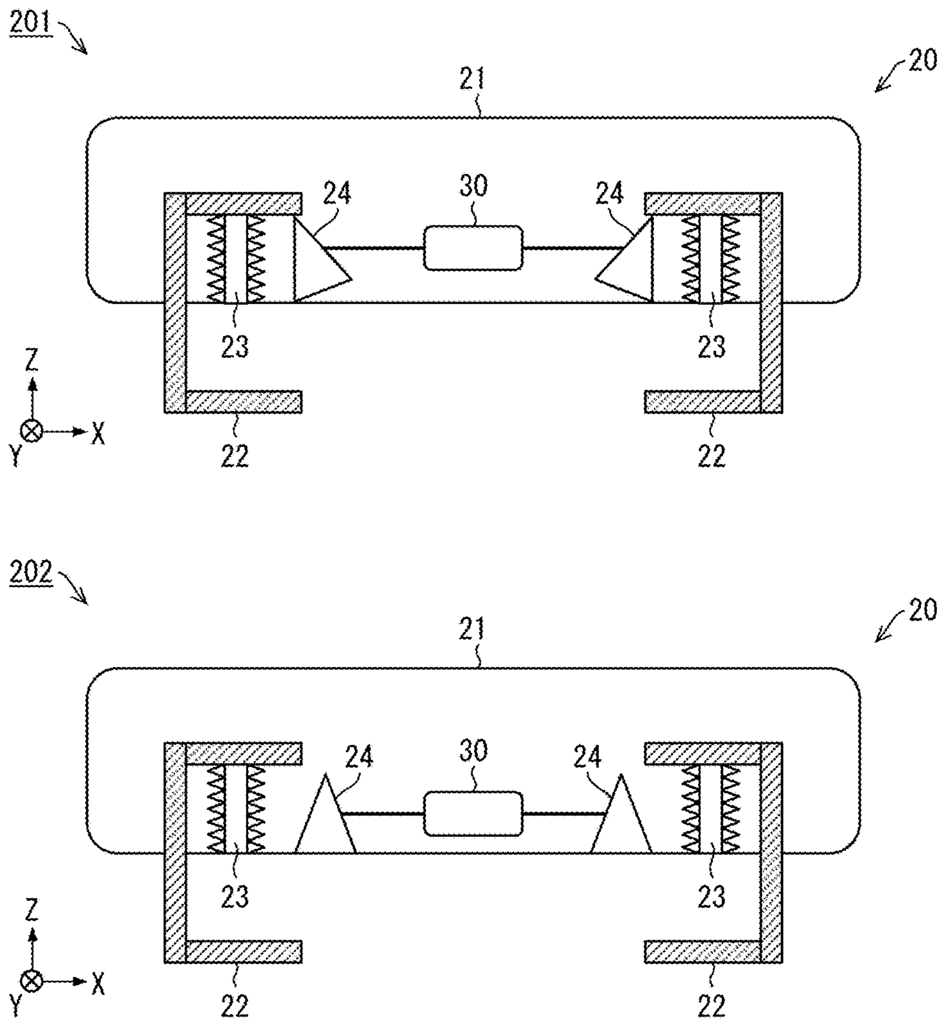
FIG. 2 is a front view illustrating an elevator member of the ceiling carrier.

FIG. 2 illustrates an example of the locking mechanism 24. FIG. 2 is a front view illustrating the elevator member 20 of the ceiling carrier 1. The reference numeral 201 of FIG. 2 indicates a lock state which prevents the gripping part 22 from operating with respect to the body part 21 due to the elastic parts 23, and the reference numeral 202 of FIG. 2 indicates an unlock state which allows the gripping part 22 to operate with respect to the body part 21 due to the elastic parts 23.

The locking mechanism 24 creates the lock state by fixing a relative position of the gripping part 22 with respect to the body part 21 so that the elastic parts 23 cannot expand or contract. In contrast, the locking mechanism 24 creates the unlock state by freeing the relative position of the gripping part 22 with respect to the body part 21 so that the elastic parts 23 can freely expand and contract.

Figure 3:
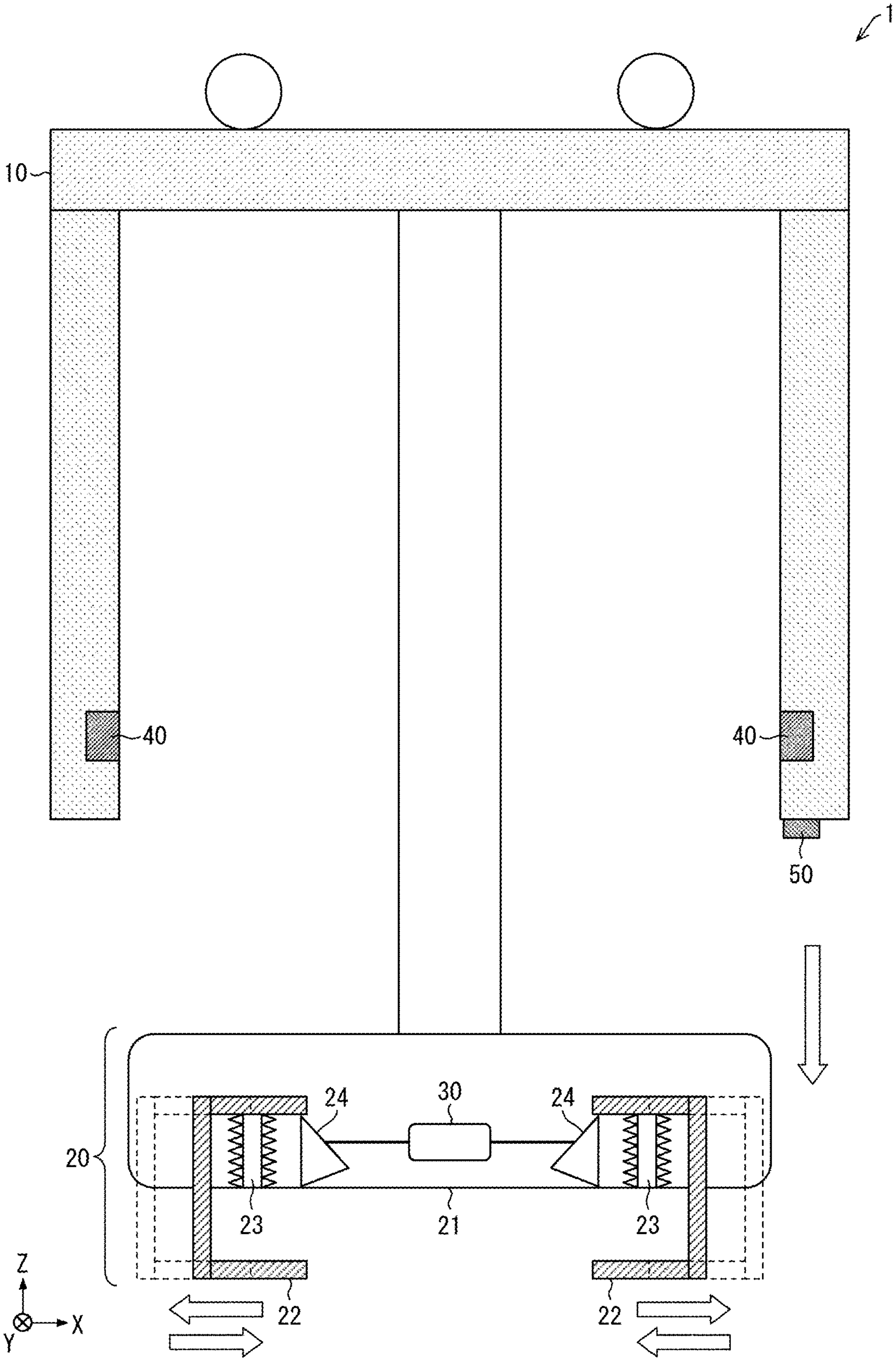
FIG. 3 is a view for explaining an operation of the elevator member.

FIG. 3 illustrates an operation of the elevator member 20. As illustrated in FIG. 3, the elevator member 20 is lowered in the Z direction and opens and closes the gripping part 22 in the X direction so as to grip the article P. More specifically, the elevator member 20 is lowered in the Z direction and opens the gripping part 22 in the vicinity of the article P. The elevator member 20 is further lowered in this state in the Z direction and closes the gripping part 22 in a position in which the gripping part 22 can grip part of the article P. This allows the gripping part 22 to grip the article P, and thus the elevator member 20 is raised while gripping the article P. Thus, the ceiling carrier 1 can transfer and convey the article P with use of the elevator member 20.

Figure 4:
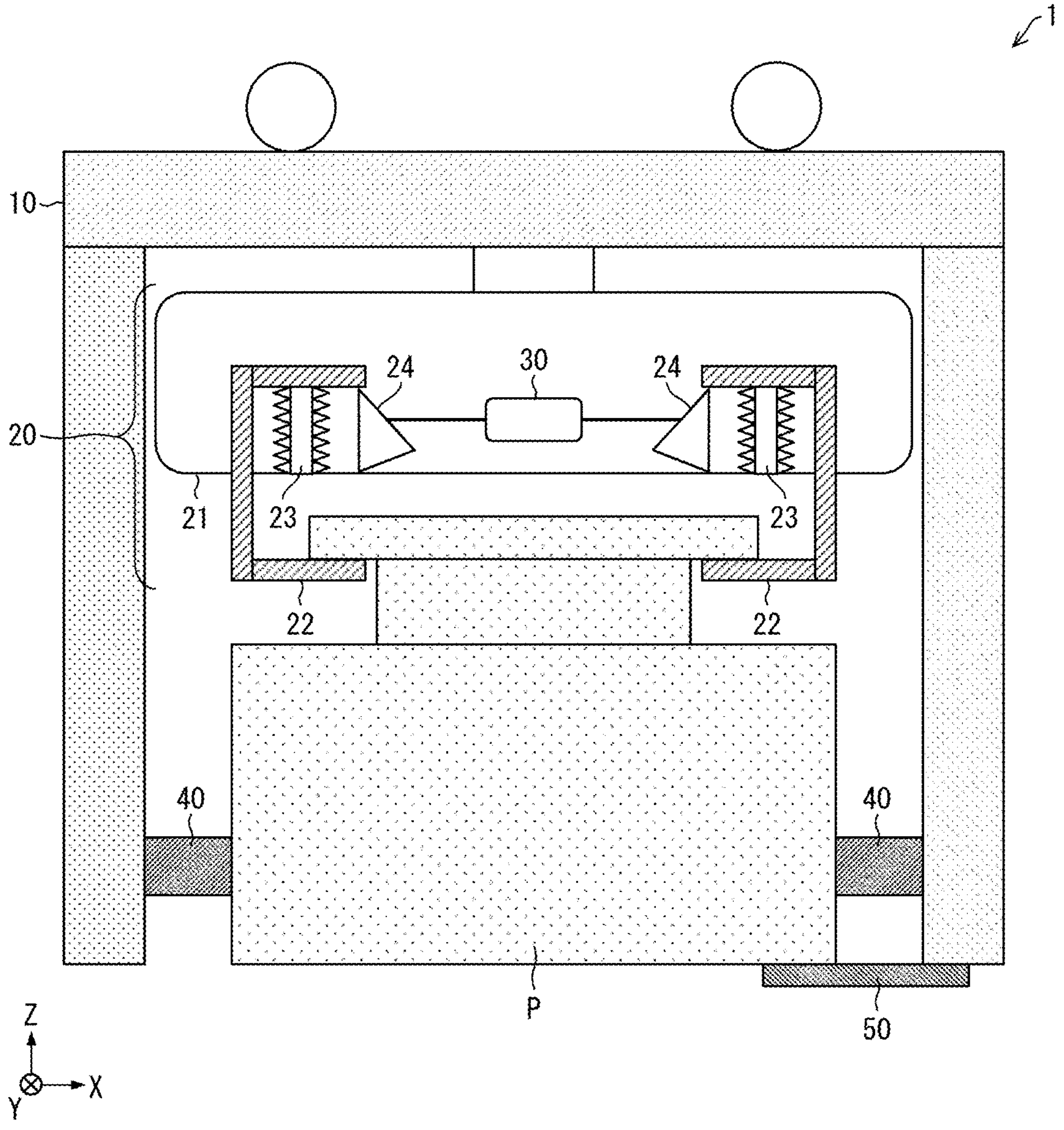
FIG. 4 is a view showing that oscillation prevention parts and a fall prevention part are operating.

FIG. 4 shows that the oscillation prevention parts 40 and the fall prevention part 50 are operating. As illustrated in FIG. 4, when the oscillation prevention parts 40 operate, the oscillation prevention parts 40 protrude from the respective side surfaces of the travelling part 10 so that the article P is sandwiched therebetween. In other words, the oscillation prevention parts 40 protrude from the respective side surfaces of the travelling part 10 in the X direction so that the article P is sandwiched therebetween. When the ceiling carrier 1 is travelling, the article P may oscillate back and forth with respect to the travelling direction due to the acceleration and deceleration. The operation of the oscillation prevention parts 40 makes it possible to cause the article P to be sandwiched from front and back with respect to the travelling direction. Thus, it is possible to prevent the article P from oscillating back and forth with respect to the travelling direction when the ceiling carrier 1 is conveying the article P.

When the fall prevention part 50 operates, the protruding portion thereof protrudes from a lower portion of a side surface of the travelling part 10 toward a bottom surface side of the article P. The protruding portion of the fall prevention part 50 protrudes so that the protruding portion overlaps at least part of the bottom surface of the article P when seen from the Z direction. This makes it possible to prevent the article P from falling from the ceiling carrier 1, even if gripping by the gripping part 22 is cancelled by accident.

Further, a configuration may be employed in which the oscillation prevention parts 40 and the fall prevention part 50 are connected to each other through a link mechanism (not illustrated) and operate simultaneously with use of a common driving part (not illustrated). This enables the oscillation prevention parts 40 and the fall prevention part 50 to operate simultaneously.

In other words, the fall prevention part 50 causes the protruding portion thereof to protrude to a position below the bottom surface of the article P so as to prevent the article P from falling. Further, the fall prevention part 50 and the oscillation prevention parts 40 operate simultaneously. This makes it possible to cause the locking mechanism 24 to enter the unlock state after the fall prevention part 50 has protruded as well as the oscillation prevention parts 40.

The switching part 30 switches between the lock state and the unlock state of the locking mechanism 24. The switching part 30 switches from the lock state of the locking mechanism 24 to the unlock state after the article P has been suspended and has been sandwiched between the oscillation prevention parts 40. The expression "article P is suspended" means that the elevator member 20 gripping the article P is raised to an upper limit position. The upper limit position is a position at which the elevator member 20 is located when the ceiling carrier 1 is travelling. In other words, the expression means that the elevator member 20 gripping the article P is raised to a position at which the ceiling carrier 1 travels.

The detail of a timing at which the switching part 30 performs the switching of the locking mechanism 24 will be described later.

[Timing of Switching by Switching Part 30]

Figure 5:
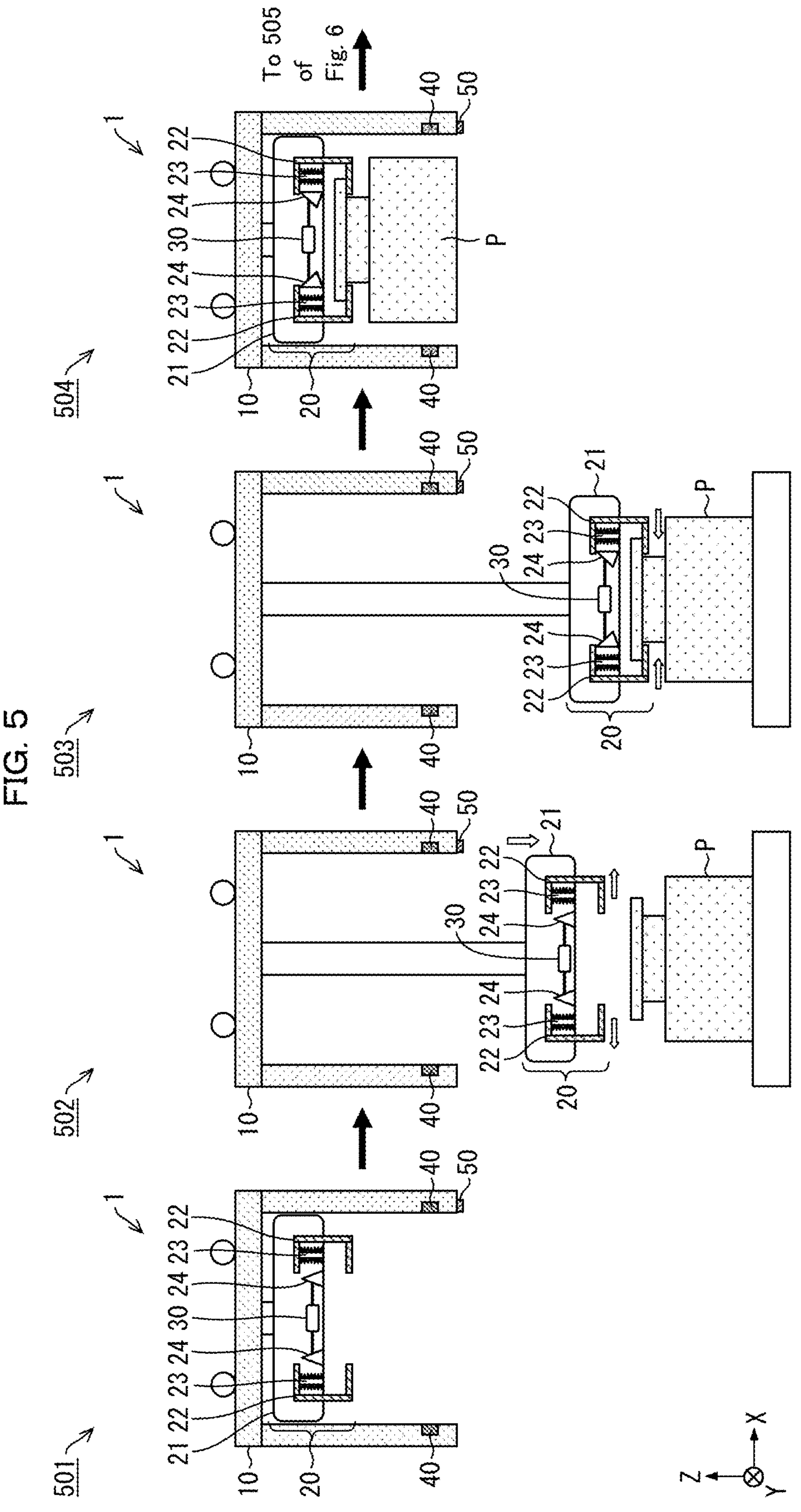
FIG. 5 is a view showing a timing of switching of a locking mechanism when an article is lifted and conveyed.
Figure 6:
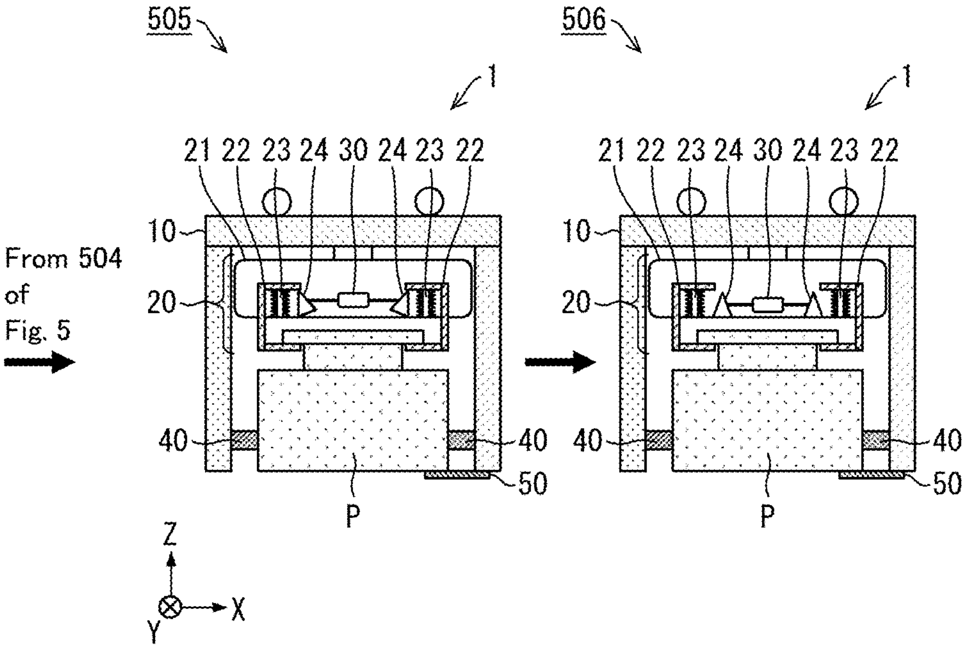
FIG. 6 is a view showing a timing of switching of a locking mechanism when an article is lifted and conveyed.
Figure 7:
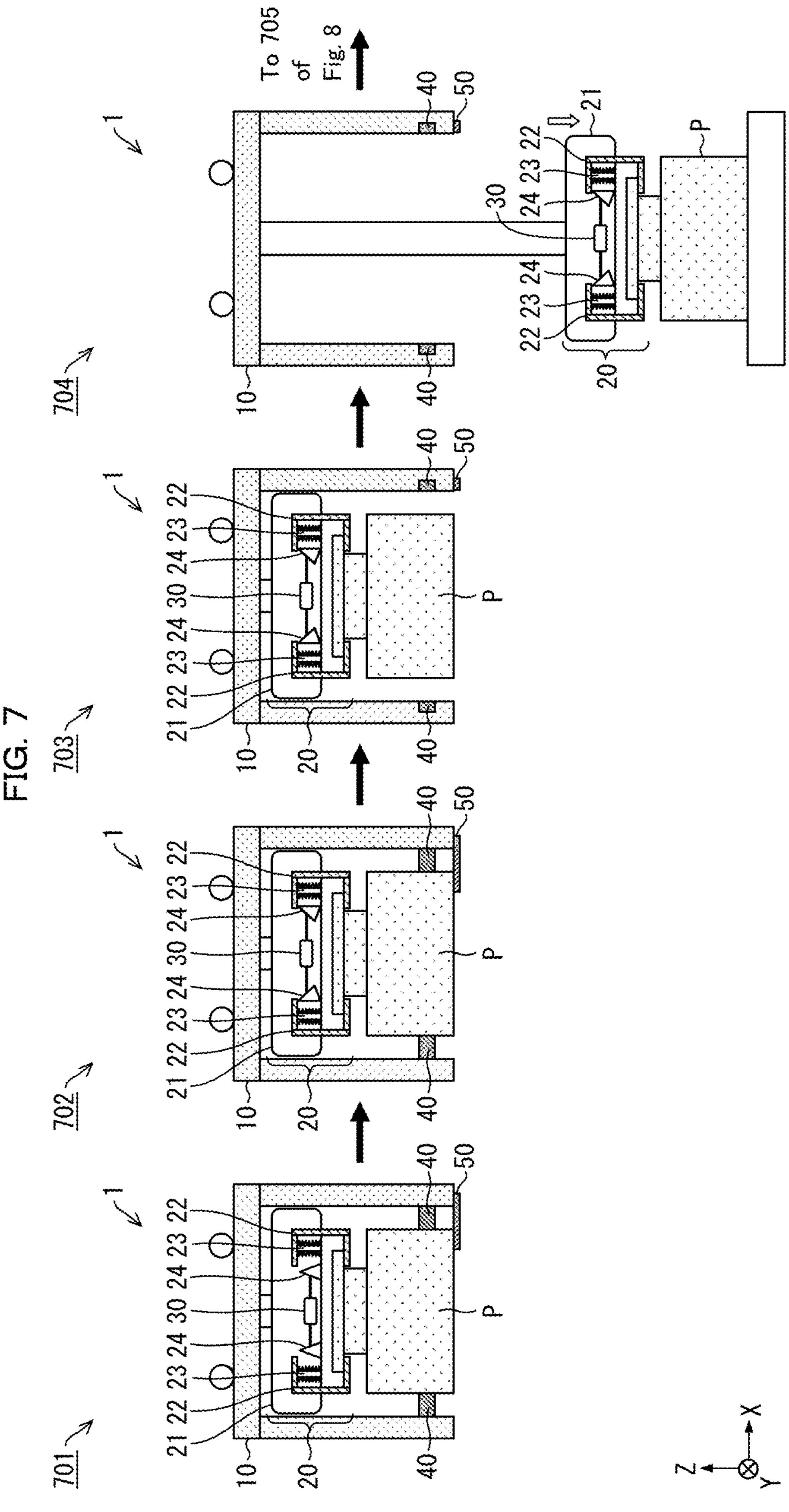
FIG. 7 is a view showing a timing of switching of a locking mechanism when an article being conveyed is transferred.

Next, with reference to FIGS. 5 to 7, the following description will discuss a timing at which the switching part 30 performs the switching of the locking mechanism 24.

The switching part 30 may perform the switching of the locking mechanism 24 in a mechanical manner or with use of software. In a case where the switching is achieved by software, the switching part 30 may include an electronic control unit constituted by, for example, a central processing unit (CPU), a read only memory (ROM), and a random access memory (RAM).

First, with reference to FIGS. 5 and 6, the following description will discuss the case where the empty ceiling carrier 1 lifts and conveys the article P. FIGS. 5 and 6 are views showing a timing of the switching of the locking mechanism 24 when the article P is lifted and conveyed.

When the ceiling carrier 1 is in a state of not conveying the article P, that is, in an empty state, the locking mechanism 24 is in the unlock state, as illustrated in the reference numeral 501 of FIG. 5. The ceiling carrier 1 travels in this state to a position of the article P, which is a transfer target, and then, as illustrated in the reference numeral 502 of FIG. 5, the ceiling carrier 1 lowers the elevator member 20 and opens and closes the gripping part 22 so as to grip the article P. The locking mechanism 24 remains in the unlock state until the article P is gripped.

Subsequently, when the gripping part 22 grips the article P, the switching part 30 causes the locking mechanism 24 to be in the lock state, as illustrated in the reference numeral 503 of FIG. 5. The elevator member 20 is raised to the upper limit position with the locking mechanism 24 in the lock state, as illustrated in the reference numeral 504 of FIG. 5, and then the oscillation prevention parts 40 and the fall prevention part 50 are caused to operate while the locking mechanism 24 keeps to be in the lock state, as illustrated in the reference numeral 505 of FIG. 6. The ceiling carrier 1 starts travelling at this time point to start conveying the article P. After completion of the operations of the oscillation prevention parts 40 and the fall prevention part 50, the switching part 30 causes the locking mechanism 24 to be in the unlock state, as illustrated in the reference numeral 506 of FIG. 6.

In other words, when the locking mechanism 24 is in the lock state, the travelling part 10 starts the travelling of the ceiling carrier 1. Further, simultaneously with or after the start of the travelling, the oscillation prevention parts 40 start an operation such that the article P is sandwiched therebetween. Therefore, at the start of the travelling, the locking mechanism 24 is still in the lock state. This makes it possible to prevent the article P from oscillating due to the travelling.

As such, the switching part 30 switches from the lock state of the locking mechanism 24 to the unlock state after the article P has been suspended and has been sandwiched between the oscillation prevention parts 40. Thus, the locking mechanism 24 enters the unlock state after the article P has been sandwiched between the oscillation prevention parts 40. Therefore, it is possible to prevent a situation in which the locking mechanism 24 enters an unlock state before the article P has been sandwiched between the oscillation prevention parts 40, resulting in oscillation and/or inclination of the article P.

Subsequently, with reference to FIG. 7, the following description will discuss the case where the article P being conveyed is placed onto a destination to which the article P is to be transferred. FIG. 7 is a view showing a timing of the switching of the locking mechanism 24 in a case where the article P being conveyed is placed onto the transfer destination.

As illustrated in the reference numeral 701 of FIG. 7, while the article P is being conveyed, the locking mechanism 24 is in the unlock state. When the ceiling carrier 1 comes closer to the transfer destination of the article P in this state, that is, when the ceiling carrier 1 reaches a point at a predetermined distance before a stop position which is the transfer destination, the switching part 30 switches from the unlock state of the locking mechanism 24 to the lock state, as illustrated in the reference numeral 702 of FIG. 7.

In other words, in a case where the ceiling carrier 1 stops at the predetermined stop position which is the transfer destination, the switching part 30 switches from the unlock state of the locking mechanism 24 to the lock state when the ceiling carrier 1 is located at a point at a predetermined distance before the stop position. Thus, switching from the unlock state of the locking mechanism 24 to the lock state is performed at a point at a predetermined distance before the stop position in a case where the ceiling carrier 1 stops, and therefore when the ceiling carrier 1 reaches the stop position, the locking mechanism 24 is in the lock state. This enables smooth start of the next operation.

Note that the switching from the unlock state of the locking mechanism 24 to the lock state by the switching part 30 and the start of cancelling of the sandwiching of the article P by the oscillation prevention parts 40 may coincide. Alternatively, the cancelling of the sandwiching of the article P by the oscillation prevention parts 40 may be started after the switching from the unlock state of the locking mechanism 24 to the lock state by the switching part 30. In either of the configurations, the cancelling of the sandwiching of the article P by the oscillation prevention parts 40 is performed in the lock state, and therefore it is possible to reduce a risk that the article oscillates.

Figure 8:
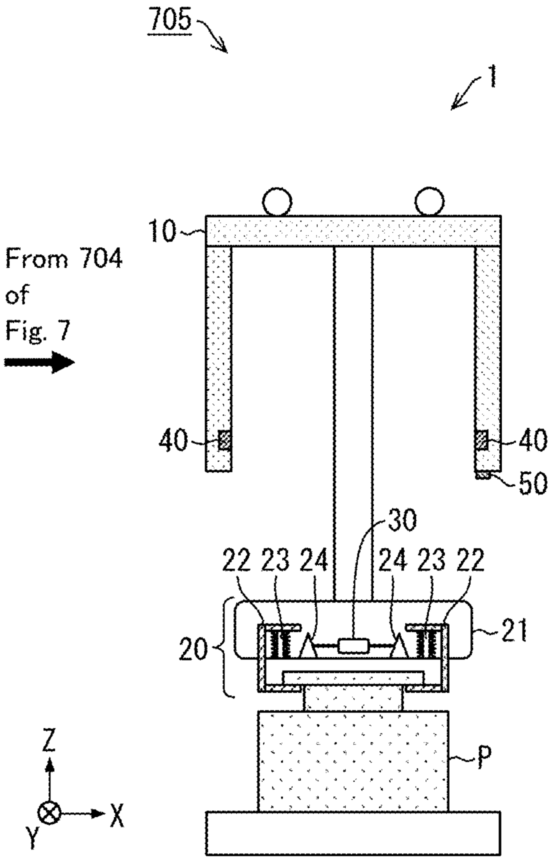
FIG. 8 is a view showing a timing of switching of a locking mechanism when an article being conveyed is transferred.

After that, the oscillation prevention parts 40 and the fall prevention part 50 are cancelled with the locking mechanism 24 in the lock state, as illustrated in the reference numeral 703 of FIG. 7. Subsequently, the elevator member 20 is lowered to transfer the article P to the transfer destination, as illustrated in the reference numeral 704 of FIG. 7. When the bottom surface of the article P is placed on the transfer destination, the switching part 30 switches from the lock state of the locking mechanism 24 to the unlock state, as illustrated in the reference numeral 705 of FIG. 8.

That is, in a case where the elevator member 20 is lowered while gipping the article P, the switching part 30 causes the locking mechanism 24 to be in the unlock state when the article P reaches the transfer destination. Thus, in a case where the elevator member 20 is lowered while gripping the article P, the locking mechanism 24 remains in the lock state until the article reaches the transfer destination. Therefore, it is possible to precisely place the article P to a placement position of the transfer destination. If the locking mechanism 24 enters the unlock state while the elevator member 20 is being lowered with the article P gripped, the gripping part 22 vertically oscillates due to a weight of the article P. This makes it difficult to precisely grasp the position in a height direction (Z direction) of the article P, resulting in fail to precisely place the article P onto the placement position of the transfer destination. According to the above configuration, it is possible to prevent such a risk.

Aspects of the present invention can also be expressed as follows:

A ceiling carrier in accordance with Aspect 1 of the present disclosure is a ceiling carrier configured to convey an article, the ceiling carrier including: a travelling part that travels along a track; an elevator member that is suspended from the travelling part so as to be raisable and lowerable and that grips an article; and oscillation prevention parts between which the article is sandwiched so as to prevent the article from oscillating. The elevator member includes a body part; a gripping part that grips the article; elastic parts that elastically support the gripping part with respect to the body part; and a locking mechanism that creates a lock state which prevents the gripping part from operating with respect to the body part due to the elastic parts. The ceiling carrier further includes a switching part that switches between the lock state and an unlock state of the locking mechanism, the switching part switching from the lock state of the locking mechanism to the unlock state after the article has been suspended and has been sandwiched between the oscillation prevention parts.

According to the above configuration, because the locking mechanism enters the unlock state after an article has been sandwiched between the oscillation prevention parts, it is possible to prevent a situation in which the locking mechanism enters the unlock state before the article has been sandwiched between the oscillation prevention parts, resulting in oscillation and/or inclination of the article.

A ceiling carrier in accordance with Aspect 2 of the present disclosure is configured, in Aspect 1, such that: the travelling part starts travelling when the locking mechanism is in the lock state; and simultaneously with or after start of the travelling, the oscillation prevention parts start an operation such that the article is sandwiched therebetween.

According to the above configuration, the locking mechanism is still in the lock state at the start of the travelling, and thus it is possible to prevent the article from oscillating due to the travelling.

A ceiling carrier in accordance with Aspect 3 of the present disclosure is configured, in Aspect 1 or 2, to further include a fall prevention part that causes a protruding portion of the fall prevention part to protrude to a position below a bottom surface of the article so as to prevent the article from falling, the fall prevention part operating simultaneously with the oscillation prevention parts.

According to the above configuration, it is possible to causes the locking mechanism to be in the unlock state after protrusion of the protruding portion of the fall prevention part has been completed by the fall prevention part as well as the protrusion of the oscillation prevention parts.

A ceiling carrier in accordance with Aspect 4 of the present disclosure is configured, in any one of Aspects 1 to 3, such that in a case where the ceiling carrier that has traveled while gripping the article stops at a predetermined stop position, the switching part switches from the unlock state of the locking mechanism to the lock state when the ceiling carrier is located at a point at a predetermined distance before the stop position.

According to the above configuration, switching from the unlock state of the locking mechanism to the lock state is performed at a point at a predetermined distance before the stop position in a case where the ceiling carrier stops, and therefore when the ceiling carrier reaches the stop position, the locking mechanism is in the lock state. This enables smooth start of the next operation.

A ceiling carrier in accordance with Aspect 5 of the present disclosure is configured, in Aspect 4, such that a state in which the article is sandwiched by the oscillation prevention parts is cancelled after or simultaneously with switching from the unlock state of the locking mechanism to the lock state by the switching part.

According to the above configuration, a state in which the article is sandwiched by the oscillation prevention parts is cancelled in the lock state, and therefore it is possible to reduce a risk that the article oscillates.

A ceiling carrier in accordance with Aspect 6 of the present disclosure is configured, in Aspect 4 or 5, such that in a case where the elevator member is lowered while gripping the article, the switching part causes the locking mechanism to be in the unlock state when the article reaches a transfer destination.

According to the above configuration, in a case where the elevator member is lowered while gripping the article, the locking mechanism remains in the lock state until the article reaches the transfer destination. Therefore, it is possible to precisely place the article to a placement position of the transfer destination.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Ceiling carrier
10 Travelling part
20 Elevator member
21 Body part
22 Gripping part
23 Elastic part
24 Locking mechanism
30 Switching part
40 Oscillation prevention part
50 Fall prevention part

The invention claimed is:

1. A ceiling carrier configured to convey an article, the ceiling carrier comprising:
- a travelling part that travels along a track;
- an elevator member that is suspended from the travelling part so as to be raisable and lowerable and that grips an article; and
- oscillation prevention parts between which the article is sandwiched so as to prevent the article from oscillating,
- the elevator member including:
  - a body part;
  - a gripping part that grips the article;
  - elastic parts that elastically support the gripping part with respect to the body part; and
  - a locking mechanism that creates a lock state which prevents the gripping part from operating with respect to the body part due to the elastic parts,
- the ceiling carrier further comprising a switching part that switches between the lock state and an unlock state of the locking mechanism,
- the switching part switching from the lock state of the locking mechanism to the unlock state after the article has been suspended and has been sandwiched between the oscillation prevention parts, and
- the travelling part starts travelling when the locking mechanism is in the lock state.

2. The ceiling carrier according to claim 1, wherein:
- simultaneously with or after start of the travelling, the oscillation prevention parts start an operation such that the article is sandwiched therebetween.

3. The ceiling carrier according to claim 2, wherein in a case where the ceiling carrier that has traveled while gripping the article stops at a predetermined stop position, the switching part switches from the unlock state of the locking mechanism to the lock state when the ceiling carrier is located at a point at a predetermined distance before the stop position.

4. The ceiling carrier according to claim 3, wherein a state in which the article is sandwiched by the oscillation prevention parts is cancelled after or simultaneously with switching from the unlock state of the locking mechanism to the lock state by the switching part.

5. The ceiling carrier according to claim 4, wherein in a case where the elevator member is lowered while gripping the article, the switching part causes the locking mechanism to be in the unlock state when the article reaches a transfer destination.

6. The ceiling carrier according to claim 1, further comprising a fall prevention part that causes a protruding portion of the fall prevention part to protrude to a position below a bottom surface of the article so as to prevent the article from falling, the fall prevention part operating simultaneously with the oscillation prevention parts.

* * * * *